Figure 1:
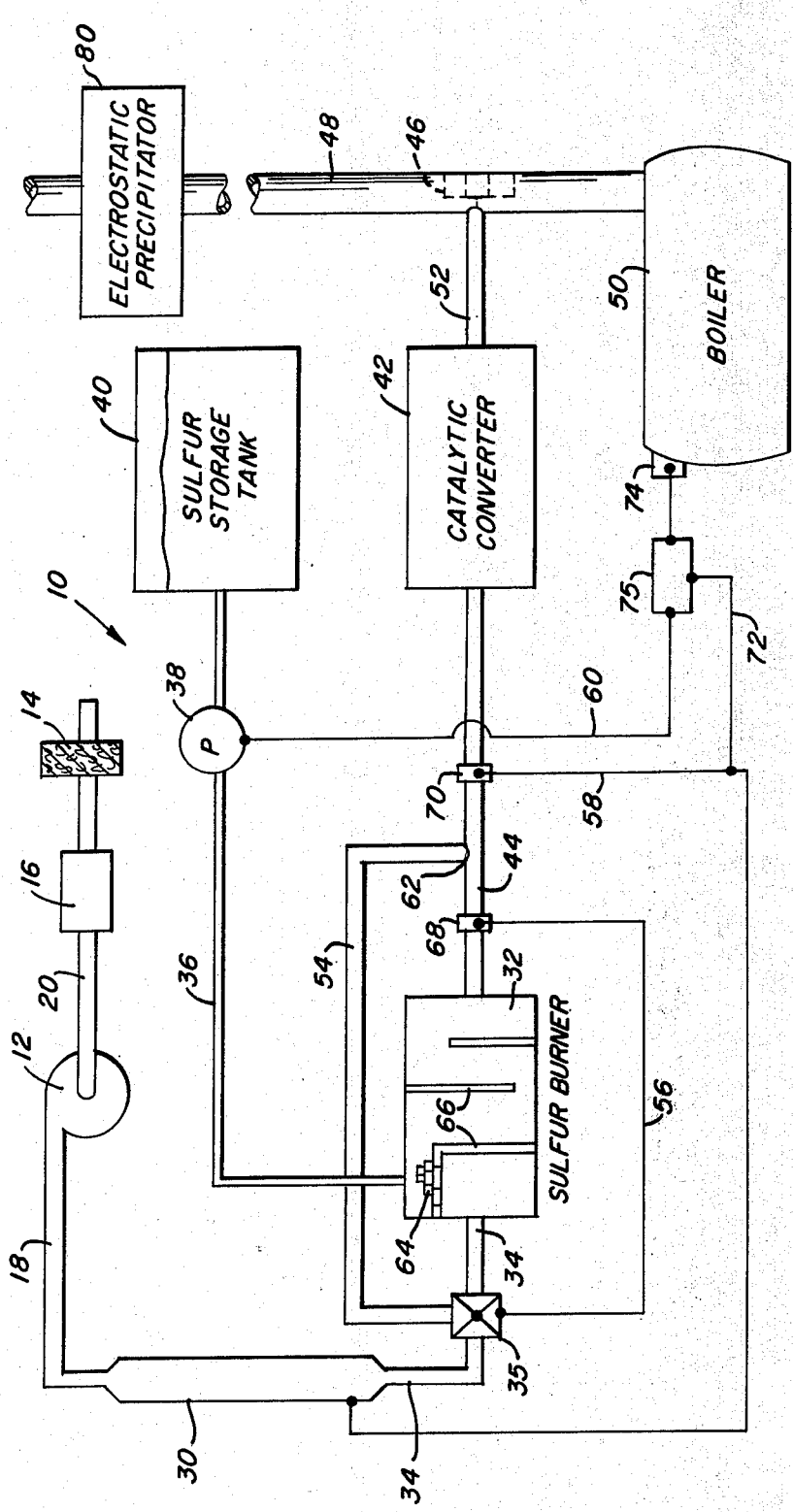

United States Patent [19]
Archer

[11] 3,993,429
[45] Nov. 23, 1976

[54] GAS CONDITIONING MEANS

[75] Inventor: William E. Archer, Huntington Beach, Calif.

[73] Assignee: Wahlco, Inc., Santa Ana, Calif.

[22] Filed: May 7, 1975

[21] Appl. No.: 575,158

Related U.S. Application Data

[63] Continuation-in-part of Ser. No. 518,271, Oct. 29, 1974, abandoned.

[52] U.S. Cl. .................................. 431/5; 23/277 C; 23/278; 55/5; 431/10; 431/11
[51] Int. Cl.² .......................................... F23D 13/20
[58] Field of Search ................... 55/4, 5, 11, 106; 431/10, 8, 11, 2, 5; 23/278, 277 C

[56] References Cited
UNITED STATES PATENTS

| | | |
|---|---|---|
| 3,212,553 | 10/1965 | Cathala .......................... 431/10 X |
| 3,424,560 | 1/1969 | Carmassi et al. .................... 23/278 |
| 3,568,403 | 3/1971 | Richardson .............................. 55/5 |
| 3,581,463 | 6/1971 | Roberts.................................... 55/4 |
| 3,665,676 | 5/1972 | McKewen ................................ 55/4 |
| 3,719,471 | 3/1973 | Jones ................................. 431/5 X |
| 3,722,178 | 3/1973 | Aaland et al. ........................... 55/4 |
| 3,837,785 | 9/1974 | Evans et al. ........................... 431/5 |
| 3,885,904 | 5/1975 | Feng ................................... 431/11 |

Primary Examiner—Edward G. Favors

[57] ABSTRACT

A gas conditioning means and more particularly a gas conditioning means incorporating an improved method of providing sulfur trioxide for injection into a flue gas stream.

50 Claims, 2 Drawing Figures

GAS CONDITIONING MEANS

REFERENCE TO RELATED APPLICATIONS

This application is a continuation-in-part of copending application Ser. No. 518,271 filed Oct. 29, 1974 now abandoned. In many cases, removal of fly ash from the flue gases of fossil fuel combustion by means of electrostatic precipitators has proven to be highly satisfactory. However, some fossil fuels such as low sulfur coal may produce an ash that does not satisfactorily respond to certain electrostatic precipitating techniques.

For example and regarding coal in particular, virtually the entire sulfur content of coal, which may vary from less than one percent to approximately six percent, oxidizes to sulfur dioxide during combustion of the coal, and from one to five percent of such sulfur dioxide further oxidizes to sulfur trioxide. Typically, as the flue gases cool after combustion the sulfur trioxide component thereof combines with entrained moisture to form sulfuric acid which condenses on fly ash particles. It is well known that the surface electrical properties of the fly ash may be largely controlled by the amount of sulfuric acid present. Thus, in the case of low sulfur coal often there is little sulfuric acid present and ash surface resistivity is correspondingly high. As a consequence collecting efficiency may be degraded considerably, particularly in precipitators which are sensitive to surface resistivity of the fly ash as for example a precipitator receiving flue gases at temperatures corresponding to normal stack exit temperatures, e.g. approximately 250° F to 320° F.

It has been found in many such cases that collecting efficiency may be vastly improved by conditioning the fly ash through introduction of a small amount of sulfuric acid into the flue gas stream prior to its entry into the precipitator. The acid condenses upon fly ash particles as the flue gases cool to advantageously alter ash surface resistivity as hereinabove noted. Recently, with the advent of strict statutory emission regulations fly ash conditioning has become increasingly commonplace and necessary as many users of fossil fuels have turned from high sulfur to low sulfur fuels.

In the prior art various processes have been proposed for sulfuric acid conditioning to fly ash to facilitate electrostatic precipitation thereof. For example, one proposed conditioning method entails the storage of relatively large quantities of liquid sulfur trioxide which is metered as required into the flue gas stream upstream of the precipitator to complement the naturally generated sulfur trioxide and thereby generate sufficient sulfuric acid for effective conditioning. This method has proven unacceptable inasmuch as liquid sulfur trioxide is an extremely corrosive chemical the proper storage, use and handling of which requires extreme care and expensive, complex equipment. For example, expensive dehumidifying apparatus is required to ensure that the air mixed with the sulfur trioxide is completely dry.

Another conditioning technique used in the prior art comprises the heating of concentrated sulfuric acid in a closed system to generate sulfuric acid vapor which may be injected directly into the flue gas stream or alternatively may be mixed with dry air for subsequent injection into the flue gases. In view of the many serious hazards of storing and using sulfuric acid in quantity such as the threat of acid spills and leaks, the deficiencies of this method are self evident.

The present invention overcomes many deficiencies of prior flue gas conditioning systems by providing a simple and safe means for mixing liquid sulfur with heated air to ignite the mixture and burn the sulfur to provide sulfur dioxide which is subsequently converted in a catalytic converter to sulfur trioxide for immediate injection into a flue gas stream.

Figure 2:
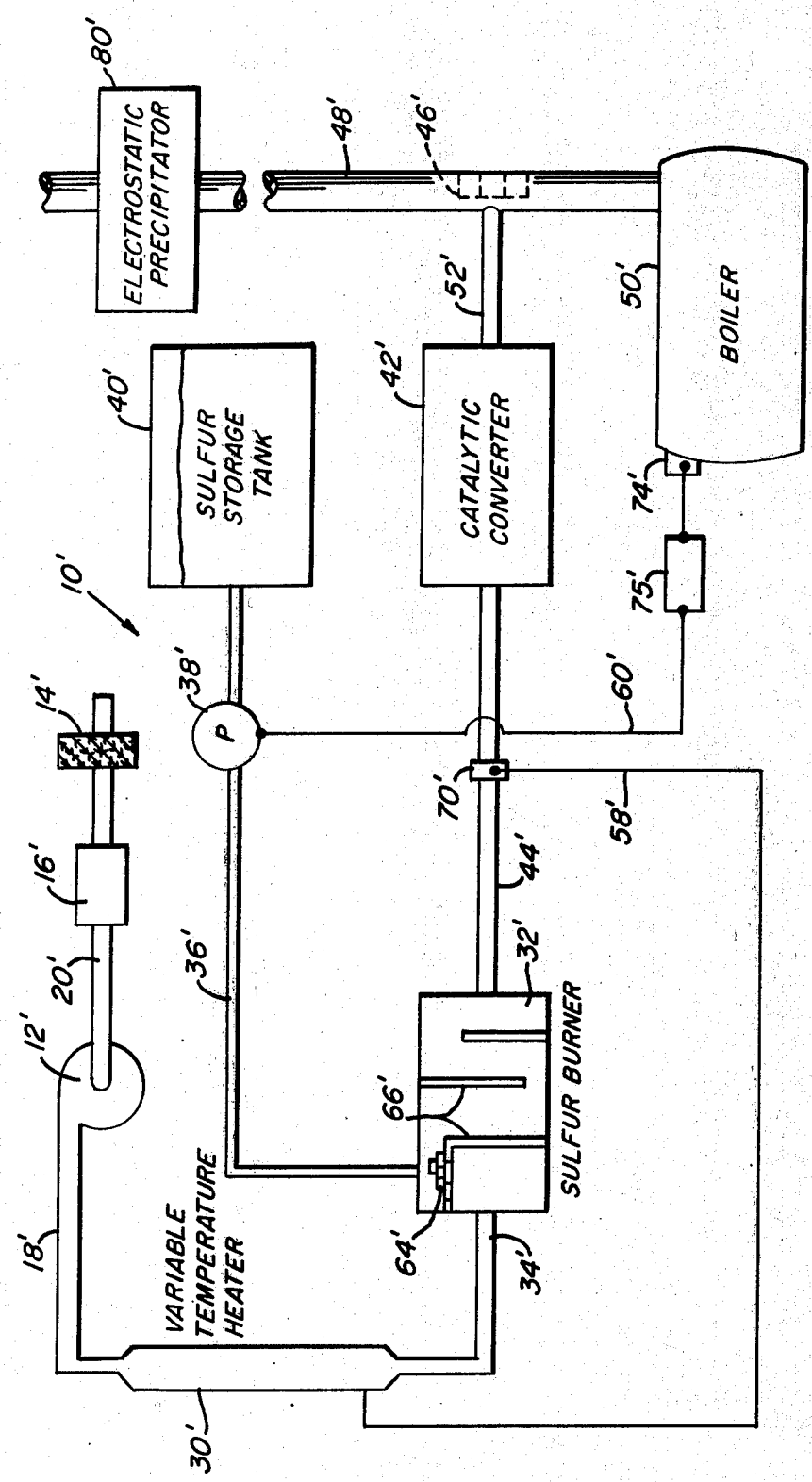

These and other objects and advantages of the present invention are more fully specified in the following description with reference to the drawings wherein:

FIG. 1 is a schematic illustration of a flue gas conditioning apparatus which operates in accordance with the principles of the invention; and FIG. 2 is a schematic illustration of a second flue gas conditioning apparatus which has also proved successful in carrying out the invention.

There is generally indicated at 10 in FIG. 1 a flue gas conditioning apparatus which is operable in accord with the method of the present invention. Those versed in the art will appreciate that in general a flue gas conditioning apparatus comprises a highly complex system ordinarily adapted for, but not limited to sulfuric acid conditioning of particulate pollutants entrained in flue gas streams to enhance arresting of such particulates by means of conventional electrostatic precipitation techniques. For purposes of illustration, the recitation hereinbelow is directed to the simplified apparatus 10 is adapted for sulfuric acid conditioning of fly ash resulting from fossil fuel combustion. Of course it is to be understood from the outset that such simplification is not intended to unduly limit the scope of the invention described.

The combustion of fossil fuels such as coal ordinarily produces quantities of fly ash, the purging of which from combustion flue gases is highly desirable. Users of large quantities of coal and other fly ash producing fuels have constantly sought effective means of purging such fly ash from flue gases, often employing conventional electrostatic precipitating apparatus in conjunction with a flue gas conditioning means such as the apparatus 10. Such conditioning means are particularly well suited to those cases where low sulfur coal is being burned and as a consequence the naturally generated conditioning of fly ash by sulfuric acid is curtailed.

The apparatus 10 comprises: an intake air fan 12, preferably a constant speed fan, the inlet of which communicates with the atmosphere via an inlet conduit 20; a heater portion 30 which communicates with the outlet of fan 12 via a conduit 18 for the purpose of receiving a flow of intake air therefrom; a sulfur burner 32 which communicates via a conduit 34 and an adjustable proportioning valve 35 with the outlet of heater 30 to receive heated air therefrom, and which further communicates via a suitable feed conduit 36 and a sulfur feed pump 38 with a liquid sulfur storage tank 40; a catalytic converter 42 which communicates with the outlet of burner 32 via a conduit 44; and a manifold injector 46 diposed within a boiler flue 48 and adapted to receive sulfur trioxide from converter 42 via a communicating conduit 52 for injection into the flue 48 to condition flue gases conveyed therethrough from a boiler 50 to a conventional electrostatic precipitator 80.

The apparatus 10 further includes a bypass conduit 54 which communicates proportioning valve 35 and conduit 44 thereby providing a bypass loop for air flow around the burner 32, and suitable automatic control lines 56, 58 and 60 which monitor and control the operation of valve 35, heater 30 and pump 38, respectively, in a manner and for such purposes as described hereinbelow.

It is of course to be understood that the tank 40 is suitably heated and insulated to be capable of maintaining the sulfur contained therewithin in a liquid state; that is, above its melting point, whereby liquid sulfur is continuously available to be pumped into burner 32.

Initially during operation of apparatus 10 intake air is drawn preferably at a constant rate by fan 12 via conduit 20 through a filter 14 to ensure intake air cleanliness, and additionally through a preheater 16 which provides consistent intake air temperature thereby further controlling intake air volume and mass flow rate. The fan 12 thence impels the intake air via conduit 18 into heater 30 wherein the air is heated as required for burner startup, for example to a temperature of approximately 800° F. The hot air is thence directed via conduit 34 into valve 35 wherein the air flow is divided between the inlet to burner 32 and the bypass conduit 54, for example in the ratio of approximately 75 percent to burner 32 and 25 percent to bypass 54. The hot air directed through burner 32 heats the interior thereof and thence exits burner 32 via conduit 44 to be rejoined within the bypass air flow in conduit 54 at junction 62. The combined air flow thence flows through converter 42, conduit 52 and the manifold 46, and into the flue 48.

The hereinabove described continuous flow of heated air may in practice constitute a standby mode of operation of the apparatus 10 would be maintained in the standby mode when not actively operating, that is, when sulfur is not being fed to burner 32, in order to prevent difficulties resulting from repeated cooling and heating of burner 32 and to keep the flow path through converter 42 and manifold 46 open and clear of debris.

In practice, a particular boiler load indicates a particular rate of coal combustion, and therefore a particular sulfur trioxide requirement to condition the resulting fly ash. Accordingly, in response to a boiler load sensed by a sensor 74 and transmitted via controller 75 and line 60, the pump 38 is regulated to deliver liquid sulfur at the required rate from tank 40 via conduit 36 into burner 32. Of course it is to be understood that controller 75 is suitably calibrated to control sulfur flow into burner 32 according to the known percent of sulfur content of the coal being burned. Within the burner 32, which is shown as a well known cascade or checkerwork type burner, the liquid sulfur cascades downwardly over a brick checkerwork 64 countercurrently to the upward rush of heated air from the burner inlet. Due to the high temperature maintained within burner 32 by the hot air flowing therethrough the sulfur ignites immediately and rapidly oxidizes to form a sulfur dioxide and air mixture containing, for example, approximately 5% sulfur dioxide by volume. Baffles 66 are provided within burner 32 downstream of checkerwork 64 to create turbulance in the air-sulfur flow thereby ensuring complete combustion of the injected sulfur within burner 32.

Combustion of the sulfur as described generates substantial heat within burner 32; however, it is desirable to maintain the burner within a predetermined temperature range during sulfur burning for optimal operation, for example approximately 1200° F to 1400° F for many known burners. To help achieve this condition the control loop 56 includes a sensor 68 located adjacent conduit 44 intermediate burner 32 and junction 62, and adapted to sense the outlet temperature of the burner 32. Inasmuch as burner outlet temperature is sometimes indicative of burner operating temperature, the loop 56 may be utilized to control burner operating temperature. Accordingly, sensor 68 communicates via the loop 56 with a suitable controller portion (not shown) of valve 35 to increase or decrease te proportion of intake air flow directed through burner 32 in response to a burner outlet temperature that is too high or too low, respectively. Preferably the valve 35 is capable of dividing the total air flow in a wide range of proportions between burner 32 and bypass 54 in order to maximize burner temperature regulating capability.

The hot air and sulfur dioxide mixture exists burner 32 and is quickly cooled by combining at junction 62 with the cooler bypass air flowing within bypass 54. Subsequently the combined air and sulfur dioxide flow is directed through the converter 42, which may be any suitable conventional catalytic converter such as a vanadium pentoxide catalytic converter, to further oxidize the sulfur dioxide to sulfur trioxide in the well known manner.

Inasmuch as the converter 42 may commonly have an optimal operating temperature well below 1200° F for example approximately 780° F to 850° F for some known converters, means are provided in control loop 58 to regulate converter operating temperature by regulating the temperature of the air-sulfur dioxide mixture flowing into the converter 42. Accordingly, loop 58 includes a sensor 70 located adjacent conduit 44 intermediate junction 62 and converter 42 and adapted to monitor the air-sulfur dioxide mixture temperature adjacent the converter inlet. The converter inlet temperature thus sensed is utilized by a suitable controller portion (not shown) of heater 30 to regulate the output of heater 30 whereby the temperature of the air flow into burner 32 and bypass 54 may be increased or decreased in response to a converter inlet temperature which is too low or too high, respectively.

Typically, during sulfur burning at maximum capacity heater 30 will be regulated to heat the air flowing therethrough only slightly, for example to approximately 100° F inasmuch as the heat of sulfur combustion under such conditions will be quite sufficient to maintain the desired burner operating temperature. Moreover, under such conditions a high proportion of a relatively cool bypass air flow is required, for example 40 versus 60 percent through burner 32 to cool the burner output from the burner operating temperature to the desired converter inlet temperature.

If during system operation the rate of sulfur burning is changed by action of the sensor 74 and controller 75 in response to a changing boiler load, the sensor 68 of loop 56 will sense the resultant change in burner outlet temperature and will automatically adjust valve 35 accordingly to bypass a greater of lesser proportion of the total air flow through conduit 54 as required. Such adjustments of the sulfur burning rate will also alter the temperature sensed by sensor 70, and in response thereto loop 58 will automatically adjust heat output of heater 30 to provide the desired converter inlet temperature. However, in response to such automatic adjustment of heater 30, outlet temperature of the burner 32 may be altered whereupon valve 35 will again be adjusted by action or sensor 68 to maintain proper burner operating temperature. Furthermore, it is to be noted that the signal used to regulate heater 30 is also communicated to controller 75 from loop 58 via a connection 72 as a feed back signal to controller 75 so that the output of pump 38 may be varied in response to the signal in loop 58 which is an indication of the actual amount of sulfur being delivered to the sulfur burner. Thus it will be seen that the control loops including sensors 68, 70 and 74 continuously interact to maintain desired thermal conditions and sulfur trioxide production rate as required. Of course it is to be understood that the control loops include suitable conventional control circuitry (not shown) to account for inherent time lags in the system, and to preclude undersirable temperature overshoots, oscillations and similar irregularities.

From converter 42 the air-sulfur trioxide mixture formed therewithin is directed via conduit 52 and the manifold 46 into the flue gas stream within flue 48. As is well known, within flue 48 the injected sulfur trioxide combines readily with moisture in the flue gas stream to produce sulfuric acid which advantageously condenses upon fly ash particles thereby effectively conditioning the fly ash for subsequent arrest by conventional electrostatic precipitating means.

With reference to FIG. 2 there is shown a simplified flue gas conditioning apparatus which has been found to operate satisfactorily. Identical elements have been identified by the same numeral as in FIG. 1 primed. The apparatus 10' is the same as the apparatus 10 of FIG. 1 except that the proportioning valve 35, bypass 54, sensor 68 feedback 72 and control loop 56 have been eliminated. As stated hereinabove the main purposes of these elements were to control the sulfur burner operating temperature and to help cool the exhaust of the sulfur burner down to the optimal operating temperature of the known catalytic converter. However, it has been found that by only controlling the temperature of the inlet air passing through heater 30' it is possible to maintain the exhaust of the sulfur burner 32' at the optimal converter temperature of approximately 850° F. Due to the nature of the checkerwork type sulfur burner 32' high turbulence is created as the burning sulfur flows through the tortuous path of the burner 32'. As a result of this turbulence localized high temperatures are maintained which provide excellent oxidation of the sulfur into sulfur dioxide; however, it has been found that as the hot gases exit the burner 32' into passage 44' it is possible to maintain the temperature thereof at approximately 850° F. In order to regulate the outlet temperature the sensor 70' senses the temperature of the exiting gas and sends a control signal via line 58' to air heater 30' which varies the heat of the incoming air accordingly. Also, the mount of air forced into the burner 32' by fan 12' is initially set to provide the proper air-sulfur mixture which will produce an outlet temperature near that desired. Thus it can be seen that an apparatus according to FIG. 2 provides a simplified sulfur burning system which will produce sulfur trioxide for the introduction thereof into a flue gas containing fly ash.

According to the foregoing recitation there is provided means for sulfuric acid conditioning of the flue gases comprising a known sulfur burner adapted to receive thereinto heated air and liquid sulfur for the combustion of such sulfur to produce an air-sulfur dioxide mixture, and further comprising a known catalytic converter adapted to convert the air-sulfur dioxide mixture from the sulfur burner into an air-sulfur trioxide mixture for immediate injection into the flue gas stream to be conditioned. According to this invention such conditioning apparatus is operable by an improved method whereby the stream of intake air may be heated prior to injection thereof into the sulfur burner to provide ignition heat for injected sulfur, and to maintain standby temperature conditions in the systems. There are provided automatic control means adapted to regulate heat output from an air heater located upstream of the air inlet to the sulfur burner whereby catalytic converter operating temperature may be controlled, and automatic control means adapted to regulate the sulfur trioxide production rate by controlling the sulfur feed rate in response to the boiler load. Additionally, there are provided in the embodiment of FIG. 1 automatic control means adapted to regulate flow through a burner bypass conduit whereby burner operating temperature may be further controlled.

Notwithstanding the reference hereinabove to particular embodiments of the present invention, it is to be understood that this invention may be practiced in various other embodiments with numerous modifications thereto without departing from the broad spirit and scope thereof. For example: a separate heater could be placed in line 54; line 54 could have a separate source; burner 32 may be other than a cascade type burner, for example a pool type burner; and may comprise a plurality of burners adapted to serve a like plurality of gas conditioning systems 10; converter 42 may be any of a variety of catalytic converters; a control loop is contemplated whereby total air flow is reduced to decrease heater power requirements during standy as by a suitably adjustable valve in conduit 18 which is regulated by a control circuit capable of sensing a no-flow condition in pump 38; the system hereinabove described preferably includes capability for total turndown from the maximum sulfur trioxide requirement to zero, for example by employing a pump 38 which is operable over a continuous range of sulfur delivery rates between shutdown and a maximum delivery rate; various additional controls, monitors and alarms in the apparatus are contemplated; and the like.

These and other modifications and embodiments having been envisioned and anticipated it is requested that this invention be interpreted broadly and limited only by the scope of the claims appended hereto.

What is claimed is:

1. A method of preconditioning a boiler flue gas mixture containing fly ash for the efficient removal of the fly ash by electrostatic precipitation comprising the steps of: directing at least a portion of a flow of air into a sulfur burner; directing sulfur into said sulfur burner; combusting said sulfur within said sulfur burner to create a fluid mixture including the combustion products of said sulfur; detecting the temperature of said fluid mixture exiting from said sulfur burner; selectively varying the quantity of said portion of said directed flow of air in response to said detecting; passing said fluid mixture through a catalytic converter to produce a conditioning mixture; and combining said conditioning mixture with said flue gas mixture prior to passing said flue gas mixture into an electrostatic precipitator.

2. A method of preconditioning flue gas as specified in claim 1 comprising the additional step of: combining a second flow of air with said fluid mixture subsequent to said fluid mixture exiting from said sulfur burner.

3. A method of preconditioning flue gas as specified in claim 2 comprising the additional steps of: detecting the temperature of said fluid mixture subsequent to said combining a second flow of air; and, selectively varying the temperature of the air in said second flow of air in response to said second mentioned detecting.

4. A method of preconditioning flue gas as specified in claim 3 comprising the additional step of: selectively varying the quantity of said second flow of air in response to said first mentioned detecting.

5. A method of preconditioning flue gas as specified in claim 4: wherein said second flow of air is another portion of said first mentioned flow of air.

6. A method of preconditioning flue gas as specified in claim 5: wherein said first mentioned flow of air is a substantially constant flow of air.

7. A method of preconditioning flue gas as specified in claim 6 comprising the additional step of: selectively varying the temperature of said air in said first mentioned flow in response to said second mentioned detecting.

8. An air pollution control apparatus providing for the efficient removal of fly ash from a boiler flue gas by electrostatic precipitation comprising: a sulfur burner; means for directing at least a portion of a source flow of air into said sulfur burner; means for directing sulfur into said sulfur burner; means for combusting such sulfur within said sulfur burner to create a fluid mixture exiting from said sulfur burner; first detecting means for detecting the temperature of such fluid mixture exiting from said sulfur burner; means for selectively varying the quantity of such portion of such source flow of air in response to said first detecting means; catalytic converter means for changing such fluid mixture to a conditioning mixture; and means for combining such conditioning mixture with such boiler flue gas prior to passing such flue gas through an electrostatic precipitator.

9. The apparatus specified in claim 8, further comprising: means for combining a second flow of air with such fluid mixture subsequent to such fluid mixture exiting from said sulfur burner.

10. The apparatus specified in claim 9, further comprising: second detecting means for detecting the temperature of such fluid mixture subsequent to the combining thereof with such second flow of air; and means for selectively varying the temperature of the air in such second flow of air in response to said second detecting means.

11. The apparatus specified in claim 10, further comprising: means for selectively varying the quantity of such second flow of air in response to said first detecting means.

12. The apparatus specified in claim 11, wherein: such second flow of air is another portion of such source flow of air.

13. The apparatus specified in claim 12, wherein: such source flow of air is a substantially constant flow of air.

14. The apparatus specified in claim 13, further comprising: means for selectively varying the temperature of the air in such source flow of air in response to said second detecting means.

15. A method of controlling a sulfur burner comprising the steps of: directing at least a portion of a flow of air into a sulfur burner; directing sulfur into said sulfur burner; combusting said sulfur within said sulfur burner to create a fluid mixture including the combustion products of said sulfur; detecting the temperature of said fluid mixture exiting from said sulfur burner; and selectively varying the quantity of said portion of said directed flow of air in response to said detecting.

16. A method of controlling a sulfur burner as specified in claim 15 comprising the additional step of: combining a second flow of air with said fluid mixture subsequent to said fluid mixture exiting from said sulfur burner to create a second fluid mixture.

17. A method of controlling a sulfur burner as specified in claim 16 comprising the additional step of: selectively varying the quantity of said second flow of air in response to said detecting.

18. A method of controlling a sulfur burner as specified in claim 16 comprising the additional steps of: detecting the temperature of said second fluid mixture; selectively varying the temperature of the air in said second flow of air in response to said last mentioned detecting.

19. A method of controlling a sulfur burner as specified in claim 18 comprising the additional step of: selectively varying the quantity of said second flow of air in response to said first mentioned detecting.

20. A method of controlling a sulfur burner as specified in claim 19: wherein said second flow of air is another portion of said first mentioned flow of air.

21. A method of controlling a sulfur burner as specified in claim 20: wherein said first mentioned flow of air is a substantially constant flow of air.

22. A method of controlling a sulfur burner as specified in claim 21 comprising the additional step of: selectively varying the temperature of said air in said first mentioned flow of air in response to said mentioned detecting.

23. A sulfur burner assembly comprising: a sulfur burner; means for directing at least a portion of a source flow of air into said sulfur burner; means for directing sulfur into said sulfur burner; means for combusting such sulfur within said sulfur burner to create a fluid mixture exiting from said sulfur burner; first detecting means for detecting the temperature of such fluid mixture exiting from said sulfur burner; and means for selectively varying the quantity of such portion of such source flow of air in response to said first detecting means.

24. The sulfur burner assembly specified in claim 23, further comprising: means for combining a second flow of air with such exiting fluid mixture to create a second fluid mixture.

25. The sulfur burner assembly specified in claim 24 further comprising: means for selectively varying the quantity of such second flow of air in response to said first detecting means.

26. The sulfur burner assembly specified in claim 24 wherein: said means for selectively varying the quantity of such portion additionally selectively varies the quantity of such second flow of air in response to said first detecting means.

27. The sulfur burner assembly specified in claim 24 further comprising: second detecting means for detecting the temperature of such second fluid mixture, and; means for selectively varying the temperature of the air in such second flow of air in response to said second detecting means.

28. The sulfur burner assembly specified in claim 27 further comprising: means for selectively varying the quantity of such second flow of air in response to said first detecting means.

29. The sulfur burner assembly specified in claim 28, wherein: such second flow of air is another portion of such source flow of air.

30. The sulfur burner assembly specified in claim 29 wherein: such source flow of air is a substantially constant flow of air.

31. The sulfur burner assembly specified in claim 29 further comprising: means for selectively varying the temperature of the air in such source flow of air in response to said second detecting means.

32. The sulfur burner assembly specified in claim 27 wherein: said means for selectively varying the temperature of the air in such second flow of air additionally selectively varies the temperature of such source flow of air in response to said second detecting means.

33. A method of preconditioning a boiler flue gas mixture containing fly ash for the efficient removal of said fly ash by an electrostatic precipitator comprising the steps of: directing a first flow of air into a sulfur burner; directing sulfur into said sulfur burner; combusting said sulfur within said sulfur burner to create a fluid mixture including the combustion products of said sulfur; combining a second flow of air with said fluid mixture exiting from said sulfur burner; detecting the temperature of said fluid mixture subsequent to said combining; selectively varying the temperature of the air in said second flow of air in response to said detecting; passing said fluid mixture through a catalytic converter to produce a conditioning mixture; and, combining said conditioning mixture with said flue gas mixture prior to passing said flue gas mixture into said electrostatic precipitator.

34. A method as specified in claim 33 comprising the additional step of: selectively varying the temperature in said first flow of air in response to said detecting.

35. A method as specified in claim 34 wherein said first and second flows of air are from a common source flow of air and the temperature of said common source flow of air is varied in response to said detecting.

36. A method as specified in claim 33 comprising the additional step of selectively varying the quantity of sulfur directed into said sulfur burner in response to said detecting.

37. An air pollution control apparatus providing for the efficient removal of fly ash from a boiler flue gas by an electrostatic precipitator comprising: a sulfur burner; means for directing a first flow of air into said sulfur burner; means for directing sulfur into said sulfur burner; means for combusting said sulfur within said sulfur burner to create a fluid mixture exiting from said sulfur burner; means for combining a second flow of air with said fluid mixture subsequent to said fluid mixture exiting from said sulfur burner; detecting means for detecting the temperature of said fluid mixture downstream of said means for combining; means for selectively varying the temperature of the air in such second flow of air in response to said detecting means; means for passing said fluid mixture through a catalytic converter to produce a conditioning mixture; and means for combining said conditioning mixture wit said flue gas prior to passing said flue gas through an electrostatic precipitator.

38. An apparatus as specified in claim 37 wherein said means for selectively varying additionally selectively varies the temperature in such first flow of air in response to said detecting means.

39. An apparatus as specified in claim 38 wherein such first and second flows of air are from a common source flow of air and said means for selectively varying selectively varies the temperature of such source flow of air in response to said detecting means.

40. An apparatus as specified in claim 37 additionally including means to selectively vary the quantity of sulfur directed into said sulfur burner in response to said detecting means.

41. A method of preconditioning a boiler flue gas mixture containing fly ash for the efficient removal of the fly ash by electrostatic precipitation comprising the steps of: directing a flow of air into a sulfur burner; directing sulfur into said sulfur burner; combusting said sulfur within said sulfur burner to create a fluid mixture including the combustion products of said sulfur; detecting the temperature of said fluid mixture exiting from said sulfur burner; selectively varying the temperature of said flow of air in response to said detecting; passing said fluid mixture through a catalytic converter to produce a conditioning mixture; and combining said conditioning mixture with said flue gas mixture prior to passing said flue gas mixture into an electrostatic precipitator.

42. A method of preconditioning a boiler flue gas as specified in claim 41 wherein said flow of air is a predetermined substantially constant flow rate.

43. A method of preconditioning a boiler flue gas as specified in claim 42 wherein said selectively varying of the temperature of said flow of air is varied to produce an exiting fluid mixture temperature of approximately 850° F.

44. A method of preconditioning a boiler flue gas as specified in claim 41 wherein said sulfur burner is a checkerwork type burner presenting a tortuous path to the fluid flow within said burner.

45. An air pollution control apparatus providing for the efficient removal of fly ash from a boiler flue gas by electrostatic precipitation comprising: a sulfur burner; means for directing a source flow of air into said sulfur burner; means for directing sulfur into said sulfur burner; means for combusting such sulfur within said sulfur burner to create a fluid mixture exiting from said sulfur burner; means for detecting the temperature of such fluid mixture; means for selectively varying the temperature of such source flow of air in response to said detecting means; catalytic converter means for changing such fluid mixture to a conditioning mixture; and means for combining such conditioning mixture with such boiler flue gas prior to passing such flue gas through an electrostatic precipitator.

46. An apparatus as specified in claim 45 wherein: said means for directing a source flow of air includes a blower providing a predetermined substantially constant flow.

47. An apparatus as specified in claim 45 wherein: said sulfur burner is of the checkwork type presenting a tortuous path to the fluid flow within said burner.

48. A method of controlling a sulfur burner comprising the steps of: directing a flow of air into a sulfur burner; directing sulfur into said sulfur burner; combusting said sulfur within said sulfur burner to create a fluid mixture including the combustion products of said sulfur; detecting the temperature of said fluid mixture exiting from said sulfur burner; selectively varying the temperature of said flow of air in response to said detecting.

49. A sulfur burner assembly comprising: a sulfur burner; means for directing a source flow of air into said sulfur burner; means for directing sulfur into said sulfur burner; means for combusting such sulfur within said sulfur burner to create a fluid mixture exiting from said sulfur burner; means for detecting the temperature of such fluid mixture; means for selectively varying the temperature of such source flow of air in response to said detecting means.

50. A method of preconditioning a flue gas mixture containing fly ash eminating from a coal burning boiler for the efficient removal of the fly ash by an electrostatic precipitator comprising the steps of: directing a flow of air into a sulfur burner; directing a flow of sulfur into said sulfur burner; sensing the rate of coal combustion in said boiler; selectively varying said flow of sulfur in response to said sensing; combusting said sulfur within said sulfur burner to create a fluid mixture including the combustion products of said sulfur; passing said fluid mixture through a catalytic converter to produce a conditioning mixture; and combining said conditioning mixture with said flue gas mixture prior to passing said flue gas mixture into an electrostatic precipitator.

* * * * *